US005617813A

United States Patent [19]
Loverich et al.

[11] Patent Number: 5,617,813
[45] Date of Patent: Apr. 8, 1997

[54] ANCHORABLE MOBILE SPAR AND RING FISH PEN

[75] Inventors: Gary F. Loverich, Bainbridge Island; Kurt T. Swanson, Poulsbo, both of Wash.; Clifford A. Goudey, Charleston, Mass.

[73] Assignee: Ocean Spar Technologies, LLC, Bainbridge Island, Wash.

[21] Appl. No.: 414,631

[22] Filed: Mar. 31, 1995

[51] Int. Cl.⁶ .................................................. A01K 71/00
[52] U.S. Cl. .......................................... 119/223; 119/240
[58] Field of Search .................................. 119/223, 228, 119/230, 240, 242, 208, 212; 405/195.1, 219, 224; 43/7, 55

[56]                  References Cited
              U.S. PATENT DOCUMENTS

| | | |
|---|---|---|
| 85,126 | 12/1868 | Pitt . |
| 203,399 | 5/1878 | Wyckoff . |
| 215,031 | 5/1879 | Webb . |
| 1,485,875 | 3/1924 | O'Malley . |
| 3,691,994 | 9/1972 | McPherson ............................ 119/223 |
| 3,992,737 | 11/1976 | Duel et al. ................................. 441/21 |
| 4,147,130 | 4/1979 | Goguel . |
| 4,312,296 | 6/1982 | Stelleman et al. ...................... 119/223 |
| 4,615,301 | 10/1986 | Maekawa et al. . |
| 4,747,369 | 5/1988 | Gotmalm ................................ 119/223 |
| 5,193,481 | 3/1993 | Loverich et al. . |

FOREIGN PATENT DOCUMENTS

| | | | |
|---|---|---|---|
| 299900 | 1/1989 | European Pat. Off. ............... | 119/223 |
| 2596613 | 10/1967 | France .................................... | 119/223 |
| 2507436 | 12/1982 | France . | |
| 2531835 | 2/1984 | France .................................... | 119/223 |
| 2562388 | 10/1985 | France . | |
| 130198 | 3/1978 | Germany . | |
| 254517A1 | 3/1988 | Germany . | |
| 52-103198 | 8/1977 | Japan . | |
| 64-22261 | 2/1989 | Japan . | |
| 1499468 | 2/1978 | United Kingdom . | |
| 2057364 | 4/1981 | United Kingdom . | |
| 2184631 | 7/1987 | United Kingdom . | |
| 2189671 | 11/1987 | United Kingdom . | |
| WO87/03170 | 6/1987 | WIPO . | |

*Primary Examiner*—Todd E. Manahan
*Attorney, Agent, or Firm*—Christensen O'Connor Johnson & Kindness PLLC

[57]                    ABSTRACT

Anchorable mobile pens for growing fish or shellfish that have an elongate central vertical spar buoy surrounded by at least one horizontal net-supporting ring with continuous netting extending from an upper end of the buoy to the ring and thence to a lower, submerged end of the buoy to produce an enclosed pen. The pen is optionally not anchored and free to float with the currents although it may more often be anchored by conventional means. The mobility of the pens provides the benefits of avoidance of localized hazards, like toxic plankton blooms, and the capability to move the pen to a more convenient fish-harvesting location, if necessary.

38 Claims, 13 Drawing Sheets

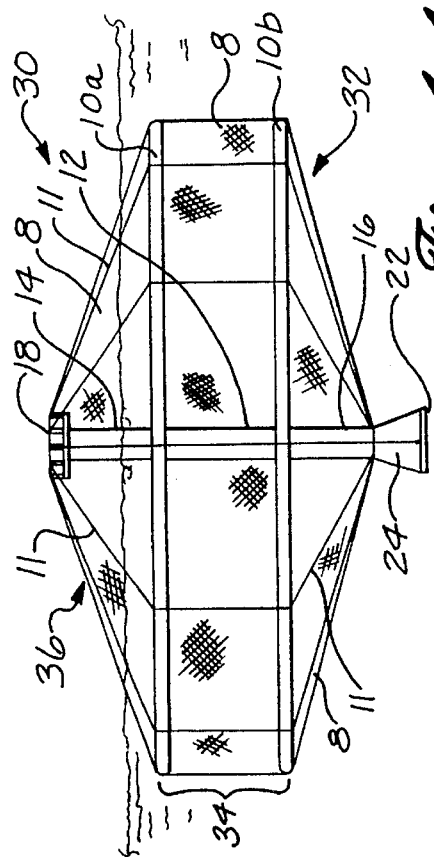
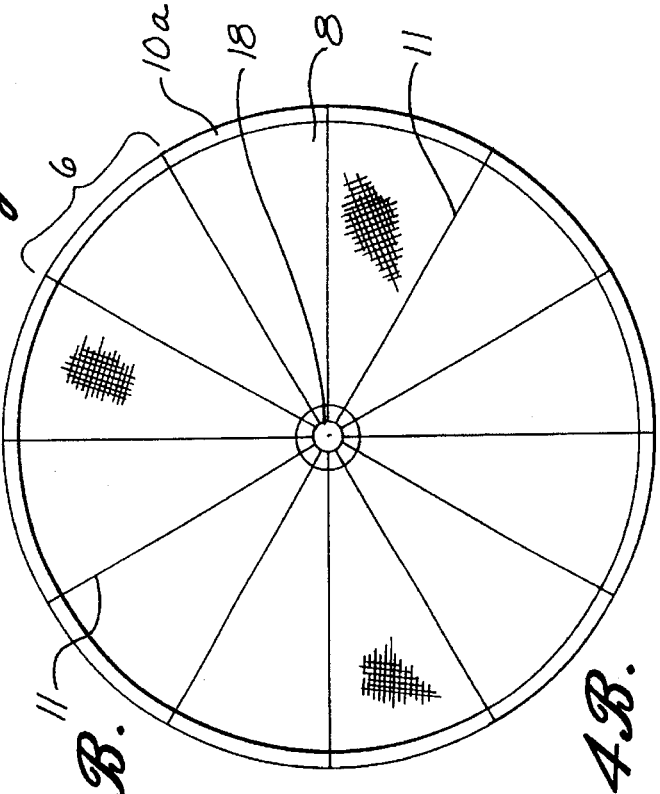
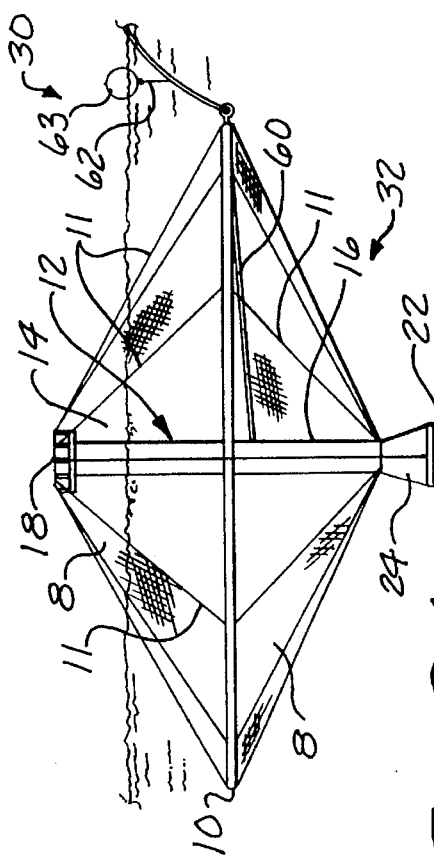
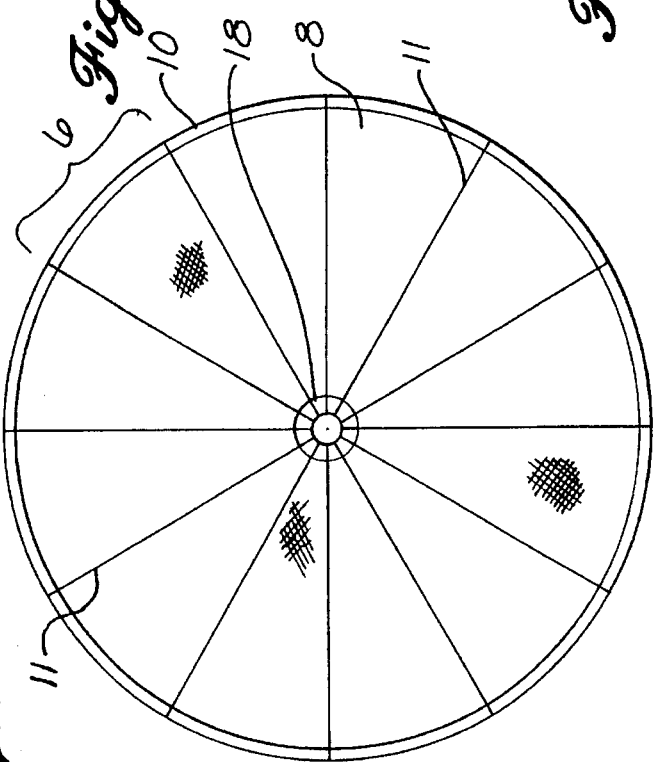

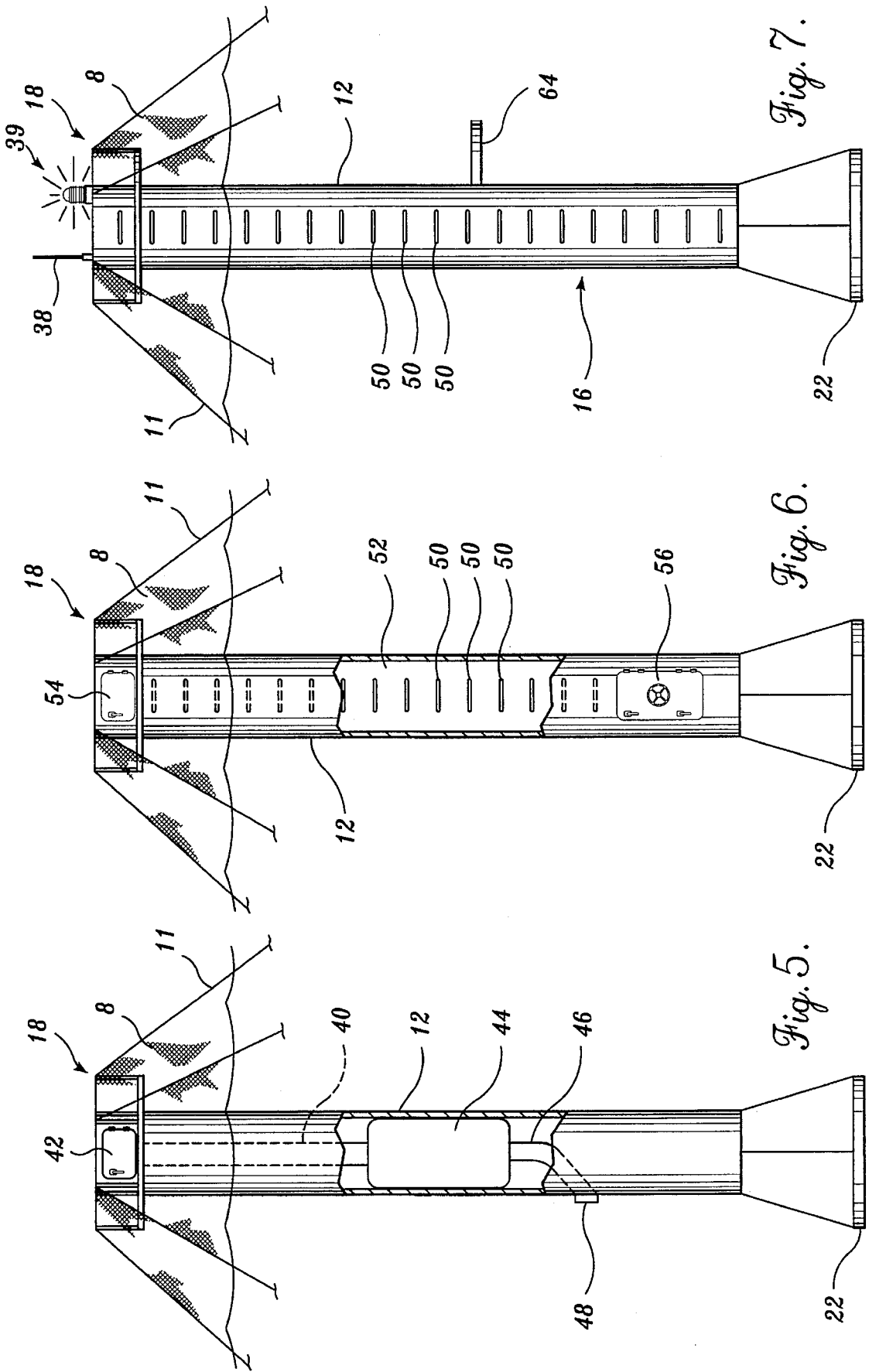

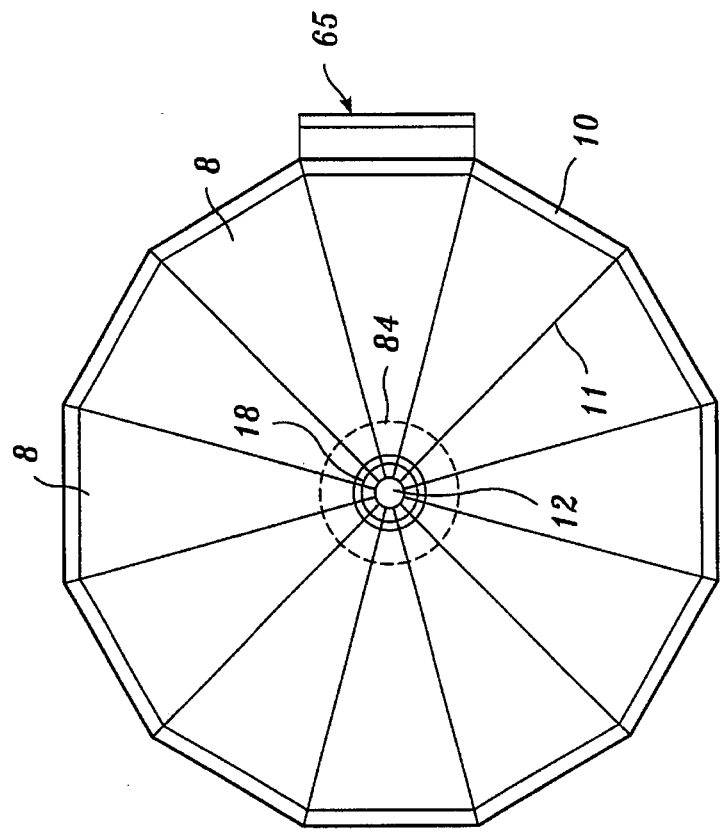
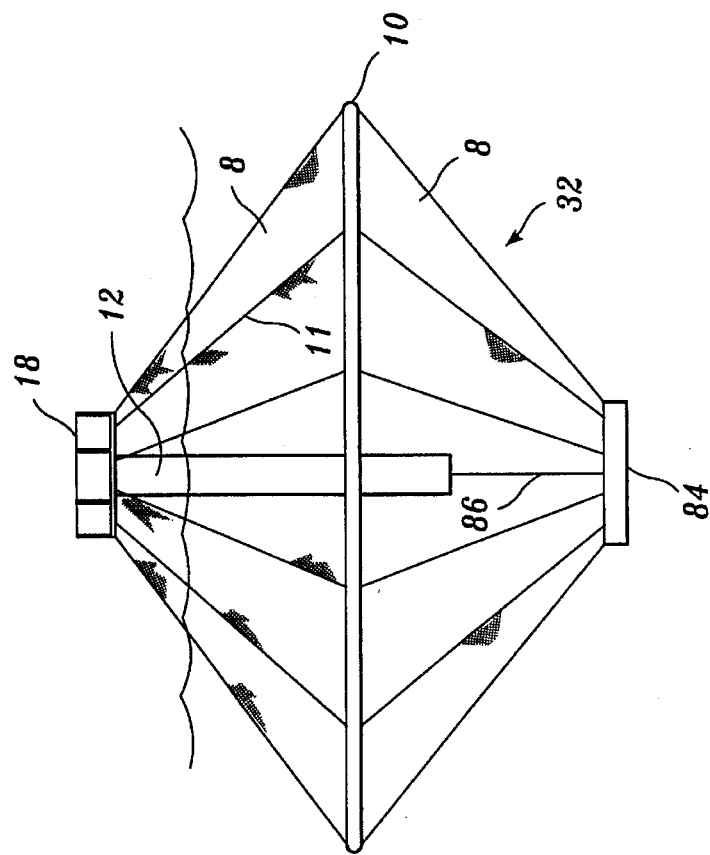

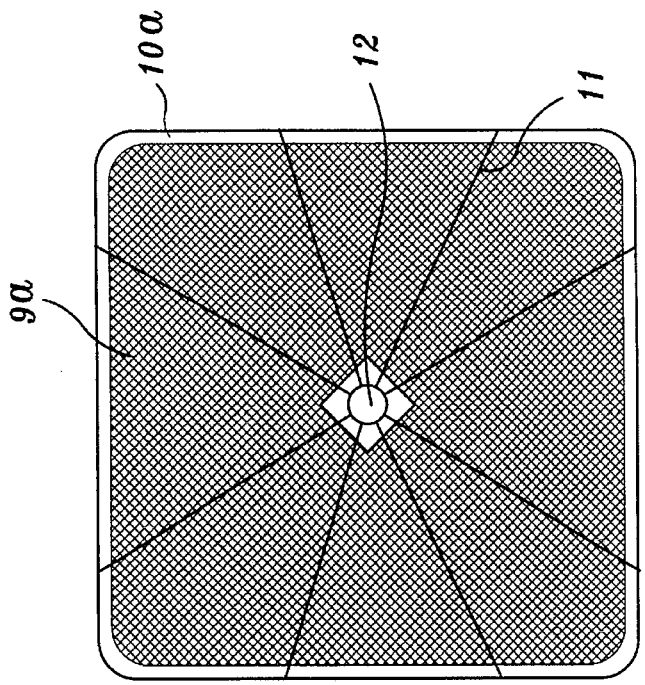
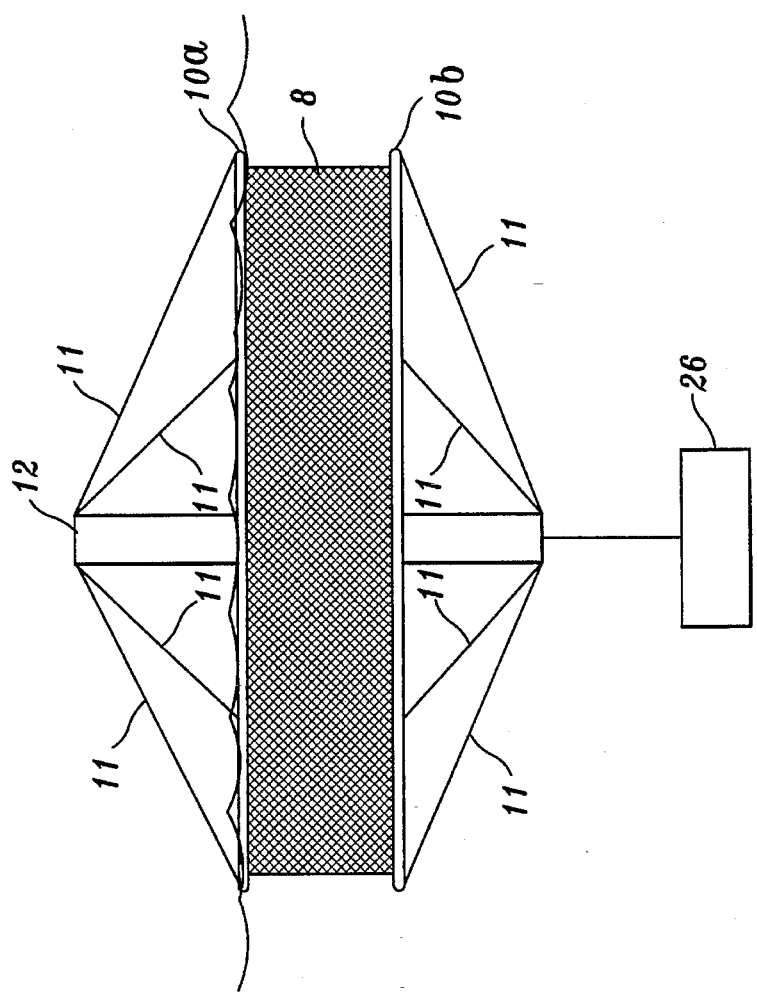

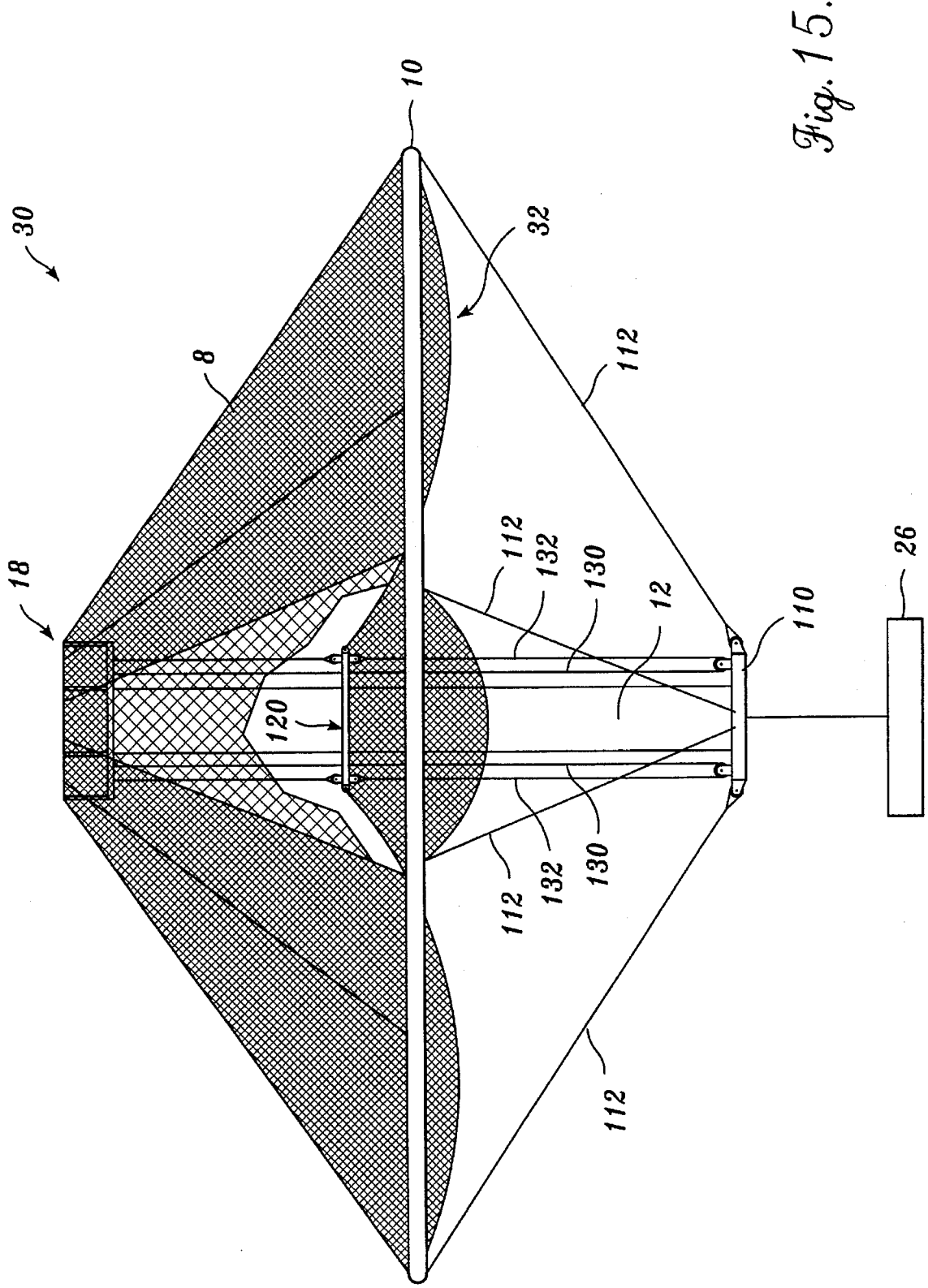

ANCHORABLE MOBILE SPAR AND RING FISH PEN

FIELD OF THE INVENTION

The invention relates to fish and shellfish pens for the farming of fish and/or shellfish in a body of water. More particularly, the pens of the invention, although anchorable, are readily made mobile, allowing the pens to drift with the currents, to be maneuvered away from potential hazards, and to be towed or powered to distant harvesting points.

BACKGROUND OF THE INVENTION

The sea, and other bodies of water, have long provided an abundant supply of food in the form of harvested fish. In recent years, due to the increase in human population and the resultant increased need for food, naturally occurring fish species have been more heavily harvested, to the extent that the populations of certain fish species have declined significantly.

Governments have tried to address the problems created by declining fish harvests and the increasing demand for fish by enacting regulations that generally limit fish harvests to maintain fish populations but that may not, in the near term, result in increased fish harvests. A market-driven method for increasing the amount of fresh fish available is to apply scientific fish-farming methods to raise fish to meet the demand. These fish-farming methods hold out the promise of a more predictable and stable fish harvest that meets market needs.

A typical prior art fish-farming pen of the type used today is essentially a tension system that is anchored to the ocean floor. In one embodiment, the pen comprises four vertical spar buoys, a substantial portion of which extend below the water. The spar buoys have damper plates coupled to the bottom that damp the vertical motion of the buoys caused by wave action. The spar buoys are arranged in a rectangular array. A box-like net is positioned within the space between the spar buoys. The upper corners of the net are connected respectively to the tops of the four spar buoys by taut lines. The bottom four corners are similarly connected to the bottom of the spar buoys by separate taut lines. Two sets of anchor lines extend outwardly and downwardly, generally in a direction away from the box net, from each of the spar buoys to maintain the taut lines under tension and to anchor the net in position. If desired, a portion of the anchor line near the spar buoys can be supported by a conventional spherical float.

While the existing fish pen described above has significant advantages over older fish pen designs, the fish pen nevertheless has significant limitations. First, the fish pen is immobile in that it must be anchored in place in order to maintain its shape and thereby retain the fish within. This lack of mobility can be a serious handicap, especially when a localized natural threat to the penned fish arises, such as when toxic plankton bloom in the vicinity and threaten to kill fish in the pen. Such toxic plankton blooms occur with some frequency off the coasts of the state of Washington, Canada, and Norway. Considering that a fish pen may contain more than 200,000 fish, each of which may have consumed a considerable quantity of fish feed, the loss of fish due to naturally occurring localized threats, such as toxic plankton, poses a serious financial risk.

In order to utilize fish pens commercially, they must be of sufficient size to enable the raising of commercially useful quantities of fish per pen. Pens of this size may generate an mount of pollution that a governmental regulatory agency may consider poses an environmental risk. Consequently, commercial fish farms are generally located where there are currents to sweep away pollutants, usually in deeper waters. These restraints on the location of commercial fish pens raise additional problems. For example, it is frequently difficult to harvest a desired quantity of fish from these large fish pens in open waters. Typically, before harvesting fish, the fish is starved for about one week to ensure a higher quality product, less subject to spoilage. With regard to harvesting, it should also be noted that even a large city can absorb a supply of only a certain quantity of fresh fish daily, without depressing prices due to a glut in the market. Thus, a fish farmer, although driven by commercial necessity to have large fish pens, would desirably wish to harvest only a fraction of the fish in each pen. Nevertheless, the fish farmer is constrained to starve all fish for one week in order to remove a proportion of good quality fish. However, if, due to weather conditions, it is not possible to harvest the desired quantity of fish after they have been starved for one week, then all the fish in the pen must be fed for their preservation. Thereafter, another one-week period of waiting must take place before a second attempt at harvesting. This not only causes uneconomical delays and financial loss, due to abandonment of scheduled harvesting plans, but also increases fish feed costs.

Whereas it is advantageous to locate fish pens in zones of water bodies where there are currents of sufficient strength to carry away pollutants and provide better oxygenation, these currents also pose a problem if they are too strong. In an immobile fish pen, the fish are required to swim constantly against the current to which they are subjected. If the currents are not too strong, then generally the exercise improves the quality of the fish stock. However, when the currents exceed a certain velocity, then the fish use an excessive amount of energy for swimming, rather than conserving the energy to build mass. Thus, the mount of nutrient supplied to the fish per pound of mass gain increases, thereby increasing costs.

There exists a need for a fish pen that can be anchored in place but that can also readily be made mobile so that it can be moved as the need arises, for instance, to avoid localized dangers posed in the water body. Further, the fish pen should be of sufficient size to allow commercial fish farming with ease of harvesting raised fish. There is also a need to minimize the mount of nutrient utilized relative to the mass gain of fish.

SUMMARY OF THE INVENTION

The invention provides versatile pens for fish and shellfish farming that may be anchored in place, partially or fully submerged, and that readily become mobile upon anchor removal while maintaining fish or shellfish captive in the pens. Because the pens have mobility, they may be readily moved to avoid potential localized hazards that arise in the water body, such as toxic plankton blooms, and they may be moved to safer waters to facilitate harvesting, as required. Further, because, in certain circumstances, the pens of the invention are not anchored but drift with the currents, fish are not required to swim as hard to counter the currents, thereby conserving their energy and allowing a greater fish mass gain relative to the quantity of nutrient supplied.

Anchorable mobile fish pens according to the invention have at least one centrally located support spar buoy that is oriented vertically when the buoy is placed in a body of water. The buoy has an upper section that may project above the water surface if the pen is used in a partially submerged mode, and a lower section that is usually submerged beneath the water surface. A horizontal net-supporting ring structure, which may be a circular ring or a ring in the form of a polygon, such as a rectangular square, triangle, and the like, surrounds the centrally located spar buoy. Flexible netting forms an enclosed pen between the spar buoy and the horizontal ring structure, the outer perimeter of the netting being maintained in shape by the supporting ring structure.

The invention also provides fish pens that have at least one vertical spar buoy, but more than one vertically spaced horizontal surrounding ring with flexible netting between the rings to form a cage midportion. The upper cage portion is also formed of netting and extends from the uppermost ring to the vicinity of an upper extremity of the spar buoy where it is attached. Similarly, the lower cage portion is formed of netting that extends from the perimeter of the lowest of the rings to the vicinity of the lower, submerged extremity of the buoy where it is attached.

For shellfish, if only an enclosed cage midportion between horizontally stacked rings is used, then the midportion may be of independent, rigid construction with taut rope lines attaching the cage to upper and lower ends of the spar buoy. For convenience of nesting several shellfish pens in a body of water, the surrounding rings are preferably square or rectangular, rather than circular.

In certain embodiments, to raise bottom-feeding fish, the fish pens of the invention include internally stacked horizontal floors, each having throughports to allow fish to move vertically from one floor to another.

The pens may be sufficiently large so that the buoy or buoys may be supplied with those comforts needed to allow continuous manning of the pens. Alternatively, they may be manned for short periods of time, or unmanned. It is, nevertheless, preferred to equip buoys of larger pens with workstations to support those operations that may normally and effectively be carried out on site.

The pens of the invention may be supplied with a system of towing lines or tow bars to facilitate removal to a selected location for harvesting or to escape from hazards. In certain embodiments, to facilitate movement of the pens, the spar buoy may be supplied with at least one impeller so that the pens are self-powered. In some instances, dual impellers may be mounted on brackets extending outward on either side of the buoy so that the buoy may be driven by these impellers and steered by remote adjustment of relative impeller speed.

The pens are readily cleaned of debris, especially the upper portions, which can be floated to above the water surface by adjusting ballast in the buoy and the ring.

In certain embodiments, harvesting of fish is facilitated by attaching lower ends of the netting of the lower portion of the pen to a harvesting bracket that surrounds the spar buoy and that is movable up and down the length of the buoy. Thus, the bracket is near the lowest extremity of the buoy to maximize pen internal space when fish is being raised (a "rest position"). However, for harvesting, the ring is moved upward (to a "harvesting position"), thereby collapsing the lower portion of the pen, reducing its volume, and concentrating the fish for harvesting.

The pens may be anchored in place, if desired, by an anchor line attached to the spar buoy's lower extremity and thence to an anchor on the water bottom. Alternatively, or in addition, anchor lines may extend from points of attachment on the ring to anchors on the water bottom.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2A is a schematic elevation of a single-ring spar buoy-supported fish pen according to the invention;

FIG. 2B is a plan view of the fish pen of FIG. 2A;

FIG. 4A is a schematic elevation of a fish pen of the invention with two vertically spaced-apart supporting rings and a central spar buoy supporting a net structure;

FIG. 4B is a plan view of the fish pen of FIG. 4A;

FIG. 5 is a schematic partial cross-sectional elevation view of a spar buoy of a fish pen according to the invention showing a fish feed system;

FIG. 6 is a schematic partial cross-sectional elevation view of a spar buoy of a fish pen according to the invention showing an internal diver shaft;

FIG. 7 is a schematic elevation view of a spar buoy of a fish pen according to the invention showing external details;

FIGS. 12A and B are an elevation view, and a plan view, respectively, of an embodiment of a fish pen of the invention adapted for use at extended depths;

FIGS. 14A and B are a schematic elevation view of an embodiment of a shellfish pen of the invention, and its plan view, respectively;

FIG. 15 is a schematic elevation view of a net using a harvesting bracket, according to the invention, with the bracket in the fish-harvesting position.

DETAILED DESCRIPTION OF THE PREFERRED EMBODIMENT

As a preliminary matter, the term "ring" as used in the specification and claims means not only a circular ring, but also a ring structure that is in the form of the perimeter of a polygon (triangle, square, rectangle, pentagon, et cetera) or in the shape of an oval or ellipse. Moreover, the shape may be asymmetrical in order to take advantage of anticipated ocean currents in the geographic region where the net pen will be located.

Figure 1:
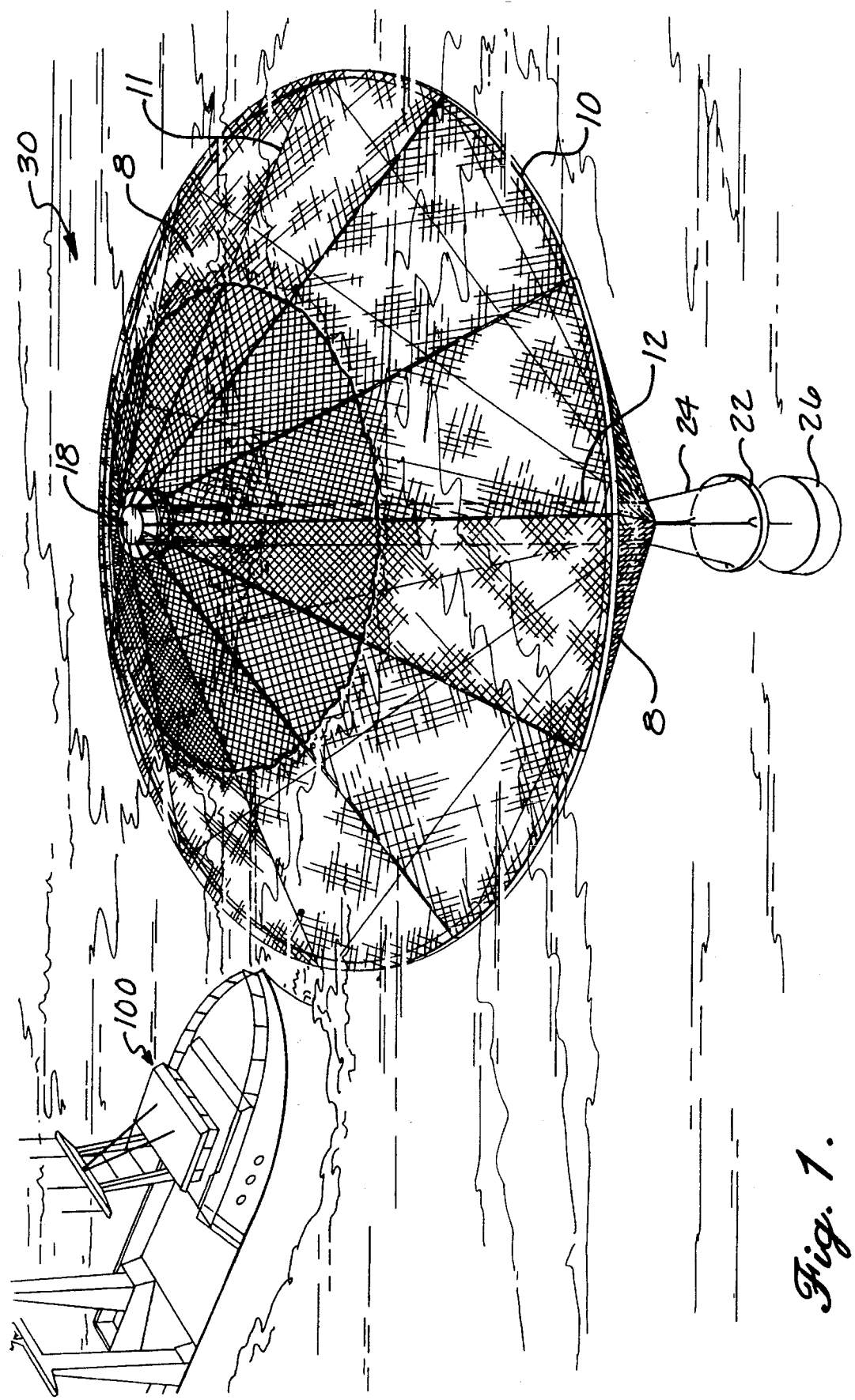
FIG. 1 shows an embodiment of a fish pen, according to the invention, that is structurally supported by a central spar buoy surrounded by a support ring.

Referring now to FIGS. 1, 2A, and 2B, one preferred configuration of a fish pen in accordance with the present invention is constructed around a single central spar buoy 12. The spar buoy is cylindrically shaped and is weighted at its lower end 16 so that it stands upright when in the water. Its buoyancy, in the embodiment shown, is adjusted so that only the upper end 14 of the buoy extends above the water, although the buoy may be entirely submerged to maximize use of pen space. A disk-shaped damper plate 22 is suspended from the bottom of the spar buoy by multiple cables 24. The damper plate is horizontal in the water and serves to damp the vertical motion of the spar buoy caused by wave action. Preferably, the damper plate is of sufficient mass to also serve as a ballast weight. Alternatively, a ballast weight 26 may be suspended from the damper plate as ballast to adjust the level at which the pen floats in the water. A large rigid ring 10 having a diameter that is substantially equal to the height of the spar buoy is positioned concentrically about the spar buoy at about half its height. The ring is submerged below the surface of the water and continuous flexible netting 8 extends from the vicinity of the top of the spar buoy out to the ring to form a frustoconically shaped upper net enclosure 36. Similarly, netting extends downwardly and inwardly from the ring toward the buoy and attaches near the base of the spar buoy to form a substantially mirror-image frustoconically shaped lower net enclosure 32. For ease of assembly, the upper net enclosure is preferably formed from a plurality of contiguous pie-shaped segments with their wedged ends attached near the upper end of the spar buoy and their circumferential ends attached to the supporting ring. A plurality of taut ropes or spokes 11 extending from the vicinity of the upper end of the buoy to the ring support the segments, as shown in FIGS. 2A and 2B. The lower net enclosure 32 is similarly formed. Preferably, a platform 18 is mounted on the upper end of the spar buoy and is sized so that a worker can carry out necessary tasks from the work platform.

The net support ring 10 must possess sufficient rigidity, when in use, to support the netting 8 in the upper and lower frustoconical shapes shown. Both ring and buoy should be fabricated from materials that withstand water conditions, such as salinity, corrosiveness, and the like. Preferably, the net support ring is fabricated from an organic polymeric pipe, such as polyethylene or polyvinylchloride, of sufficient thickness to provide the necessary support.

The fish pens of the invention are designed for optimum utilization of interior volume to raise fish. Thus, the pens may be controlledly submerged to the degree required for optimum use of space by adjusting the ballast of the buoy, by filling with water to a certain level and/or suspending weights from its lower extremity, or adjusting the ballast of the ring.

Thus, a damper plate and ballast weight combination 22 may be attached, by several ballast lines 24, to the end of the buoy, as shown in FIG. 1. If necessary, a further ballast weight 26 may be suspended from the damper plate. Not only does the damper plate-ballast weight assist in determining the portion of the fish pen that will be submerged, but it also stabilizes the vertical spar buoy against wave action.

Preferably, the pens are submerged so that 80–100% of their interior volume is below the water surface. Usually, the primary ballast controlled for submersion is the ballast of the buoy.

The ballast of the ring may be adjusted, by filling the ring with water or air, to assist in controlling the level at which the ring stabilizes in the water body and hence the portion of the pen that is submerged. Alternatively, the ring may be of an inflatable design, such as a fabric ring filled with water, to ensure that the ring is rigidly supported and the entire pen structure will float. Such inflatable designs offer certain practical advantages because they are collapsible, and are also of relatively lower cost than rigid designs. Inflatable rings, for example, facilitate harvesting in that they allow the collapsing of the pen into a smaller volume for easier handling. Ballast may also be supplied by adding weights or buoys at intervals to the ring structures.

The capability to adjust the ballast of rings, whether of inflatable design or not, is important because it allows some adjustment of the portion of the pen that is below the water surface. Thus, for instance, to facilitate harvesting, as a first step fish may be concentrated into a smaller volume by deballasting the rings, for example, by filling with air, so that the pen rises up until the ring floats on the water surface.

Figure 3:
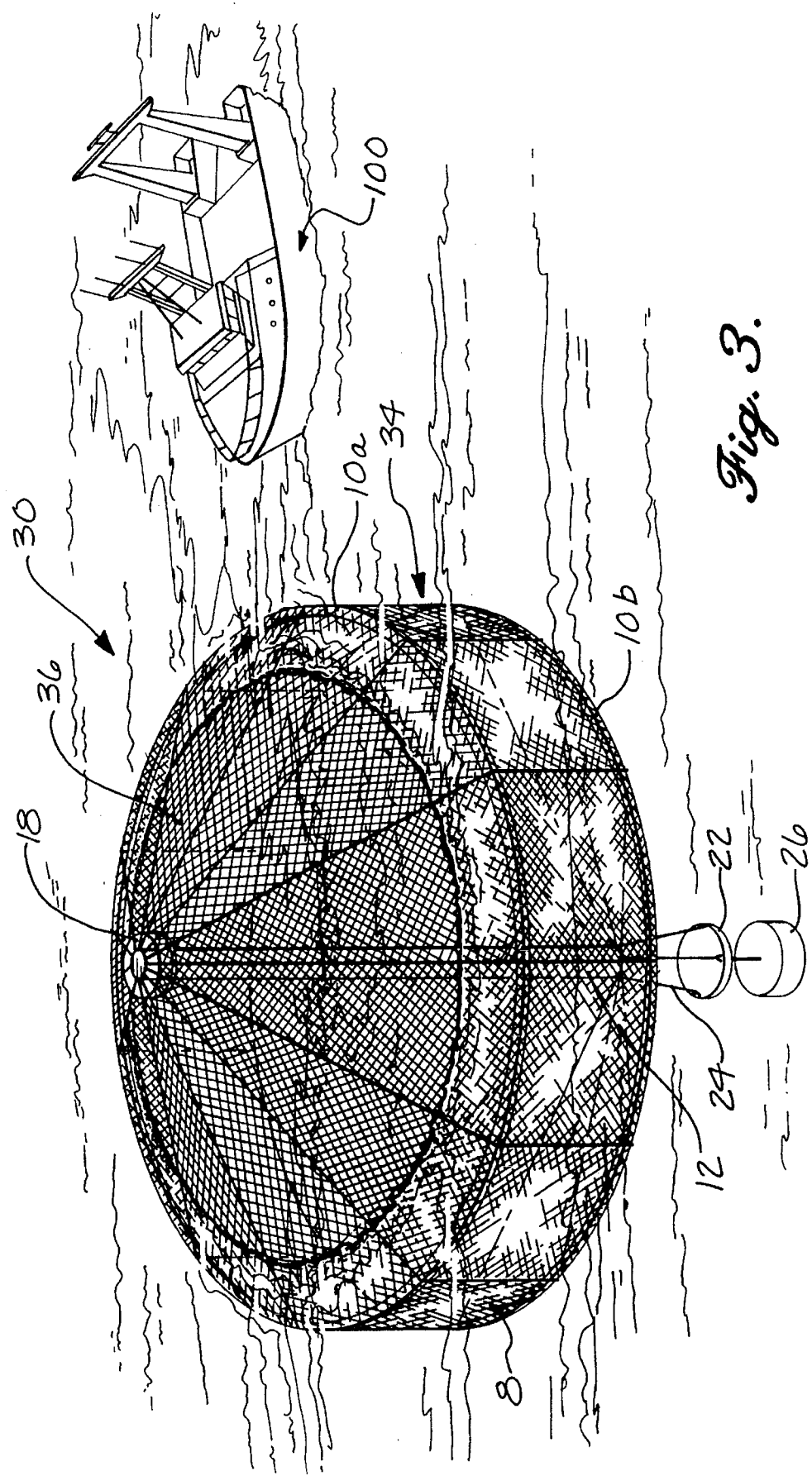
FIG. 3 shows another embodiment of a fish pen according to the invention, wherein a central support spar buoy is surrounded by two vertically spaced-apart rings, one above the other, to provide structural support to the netting.

In an alternative embodiment of the fish pens according to the invention, shown in FIGS. 3, 4A, and 4B, the pen has two horizontal net support rings 10a and 10b, vertically spaced from each other. An elongate central spar buoy 12, preferably of adjustable ballast, extends vertically through the center of both rings so that the rings surround the buoy. The buoy may be stabilized and weighted with a damper plate 22 and tom weight 26. A fish pen structure 30 is formed by spanning the distance between the upper end of the spar buoy to the upper net-retaining ring, thence to the lower net-retaining ring, and finally to the submerged end of the spar buoy, with flexible netting 8 as shown in FIGS. 2, 4A, and 4B. As a result, the fish pen has effectively three adjacent sections in open communication with each other when the pen is in use: a lower frustoconical-shaped section 32, with apex oriented downward, that is completely submerged; an intermediate cylindrical-shaped section 34, contiguous with the circumference perimeter of the lower cone, that is completely submerged; and an upper frustoconical-shaped section 36, with apex at the upper end 14 of the spar buoy and contiguous with the upper perimeter of the cylinder-shaped section, that may be at least partially submerged. As in the above-described single ring embodiment, the netting that forms the upper and lower frustoconical sections may be of a series of overlapping pie-shaped net sections, with their wedged ends attached to the buoy and their circumferential ends attached to the rings. The net-supporting rings 10a and 10b are also preferably of a type that will allow ballast adjustment by filling with air or water, as required.

In order to service the pens according to the invention, a fishing vessel 100 may tie onto the net support ring and a fisherman may then climb up a net segment to the workstation of the spar buoy. The pens may be manned or remotely controlled and the workstation is equipped according to these considerations. As shown in FIG. 7, the workstation may be used for storing repair equipment and for a radio transmitter 38 to keep track of the location of the mobile pen. To facilitate night work, the pen may be fitted with a spotlight 39. Moreover, to warn vessels of the pen, the workstation and ring may be provided witch running lights timed to operate at night or activated by a low light level detected by a light metering device. Power supply may be provided by a rechargeable battery stored in the work station, or an electricity generator. Recharge of a battery may be provided by solar cells that collect energy during sunlight hours.

In certain embodiments, especially those that include large fish pens, with radii exceeding about two meters, the large spar buoy required may be designed to facilitate dispersal of fish feed to fish within the pen. In this circumstance, as shown in FIG. 5, the spar buoy 12 preferably has a central shaft 40 with one end extending to a portal 42 near the workstation for receiving fish feed and another end extending into a storage silo 44 within the confines of the buoy. A feed outlet conduit 46 extends from the storage silo to at least one feed discharge port 48 in the spar buoy. Thus, at predetermined times, the fish may be fed by either manually opening the feed discharge port or activating an opener automatically, to disperse fish feed from the silo into the fish pen, in a predetermined amount.

Moreover, the spar buoy may be designed to allow a diver ready access to the interior of the fish pen. This may be achieved by providing an internal or external stairway on the buoy. The stairway may be of conventional type or may merely comprise several handrails spaced for ease of use. Thus, handrails 50 extend down the outer surface of the spar buoy, as illustrated in the embodiment of FIG. 7, from the workstation to the water surface. Alternatively, as shown in FIG. 6, the buoy may be provided with an internal vertical shaft 52 that extends parallel to the longitudinal axis of the buoy from the workstation to at least the water surface, sized so that a diver may enter the shaft through a portal 54 and climb down the shaft from the workstation, exiting through a diver's portal 56, to reach the water surface for carrying out tasks, such as inspection of the pen or the fish. In large buoys, the internal shaft may accommodate a spiral staircase to facilitate the diver's ascent or descent. Moreover, an airlock room should conventionally be located directly behind, or in fluid communication with both the diver's portal 56 and the stairway. Upon entering this room, the diver closes all exits and pressurizes the room to ambient outside pressure with water. Portal 56 is then opened to allow diver egress. Upon diver reentry into the room, portal 56 is closed and water is pumped from the room before opening a portal to allow access to the stairway.

The fish pens of the invention are able to drift with the currents, but may also be towed in a specific direction by a vessel. Such towing may become necessary to remove the pen from a danger, such as toxic plankton blooms, or to remove the fish to a more convenient harvesting location. In order to facilitate the towing, a tow line system is provided, as shown in FIG. 2A. A first tow line 60 has one end attached to the spar buoy 12 and extends, in a slack condition, to the net-supporting ring 10 or upper net-supporting ring 10a for a second point of attachment. A free end 62 of the tow line, optionally attached to a floater buoy 63, extends from the support ring out of the fish pen so that it may be tied onto a towing attachment point on a vessel. Alternatively, a strong tow bar 65 may be attached to the ring of the pen and a tow line may be tied onto this bar to tow the pen, as shown in FIG. 12A.

In certain embodiments according to the invention, the fish pen may be supplied with sensing devices 64, as shown in FIG. 7, mounted on a submerged lower end 16 of the spar buoy 12, such as an oxygen sensor, an underwater video camera or an acoustic monitor, for monitoring the number of fish in the fish pen. Grow lights to influence fish behavior may also be located at or near the sensing device 64 position.

Figure 8:
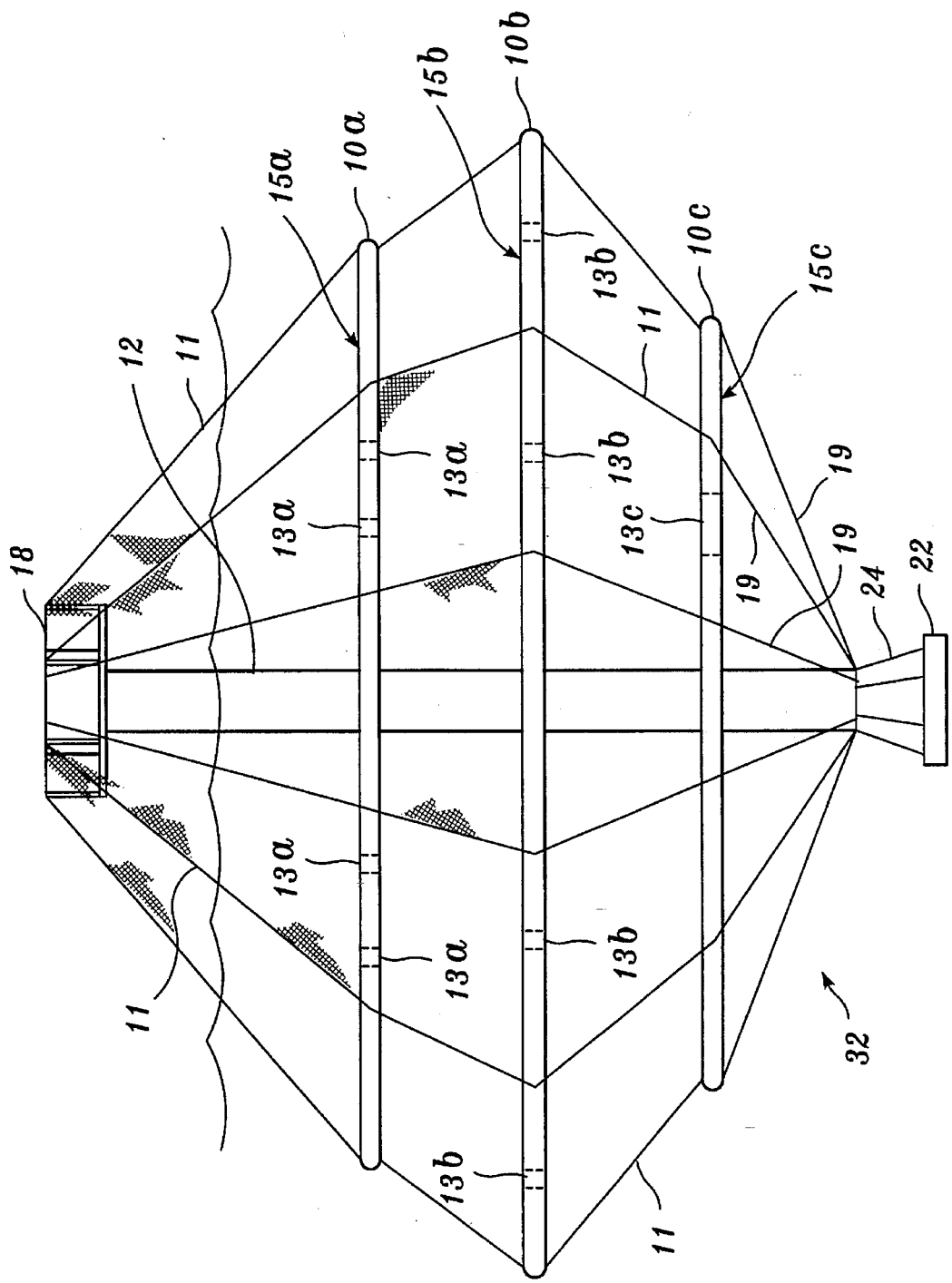
FIG. 8 is a schematic elevation view of a fish pen according to the invention with three net-supporting rings and three internal floors.

In certain embodiments, it may be advantageous to use several rings in combination with a central spar buoy, or grouping of spar buoys. The embodiment of FIG. 8 shows a central spar buoy 12 surrounded by three horizontal rings 10a, 10b, and 10c, stacked in a vertical array. The diameters of rings 10a and 10c are approximately equal, and less than the diameter of ring 10b. Thus, the pen assumes an approximately spherical shape, when round rings are used. This type of pen is particularly advantageous if the pen is to be used for bottom-feeding fish, since floors 15a, 15b, and 15c may be installed extending continuously in the planes of each of the horizontal rings 10a, 10b, and 10c, respectively. Preferably, the floors are of a semi-rigid continuous material (i.e., a material that is flexible to the extent that sheets can be rolled up but relatively rigid in sections of about one square meter). These floors provide a surface from which the fish may feed and throughports 13a and 13b in the floors allow the fish to travel vertically from one floor level to the other, thereby potentially maximizing the use of available floor area. As with other embodiments of the fish pens of the invention, it is preferred that the buoy and rings are constructed so that their ballast may be adjusted by filling with air or water, or attaching weights to the rings at spaced intervals. Further, the central spar buoy 12, or group of buoys, is supplied with a horizontal damper plate and ballast weight combination 22 suspended by lines 24 at its lower end for added stability. In preferred and larger embodiments, a work station 18 is provided, as shown in FIG. 8.

For reasons of economy, netting may be eliminated from the lowest section 32 of the floor-feeder pen, as shown in FIG. 8. Thus, the lower end of the pen is secured in the vicinity of the lower extremity of the pen by taut lines 9. A trapdoor 13c may be provided in the lowest floor for diver access and to facilitate harvesting, if fish are concentrated in the lowest section of the pen (between floors 11b and 11c, as shown). Alternatively, the lower section 32 of the pen may be enclosed with a predator net.

Figure 9B:
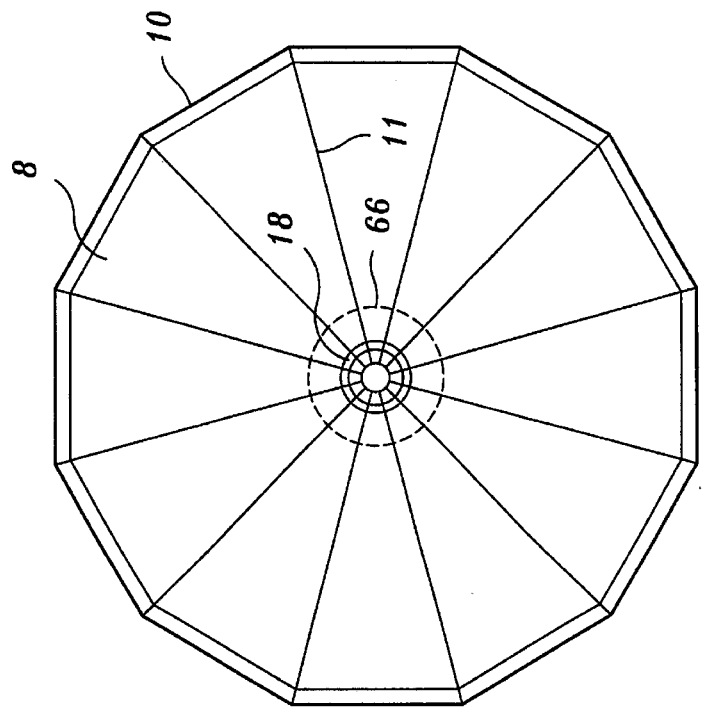
FIG. 9B is a top view of the embodiment of FIG. 9A.
Figure 9A:
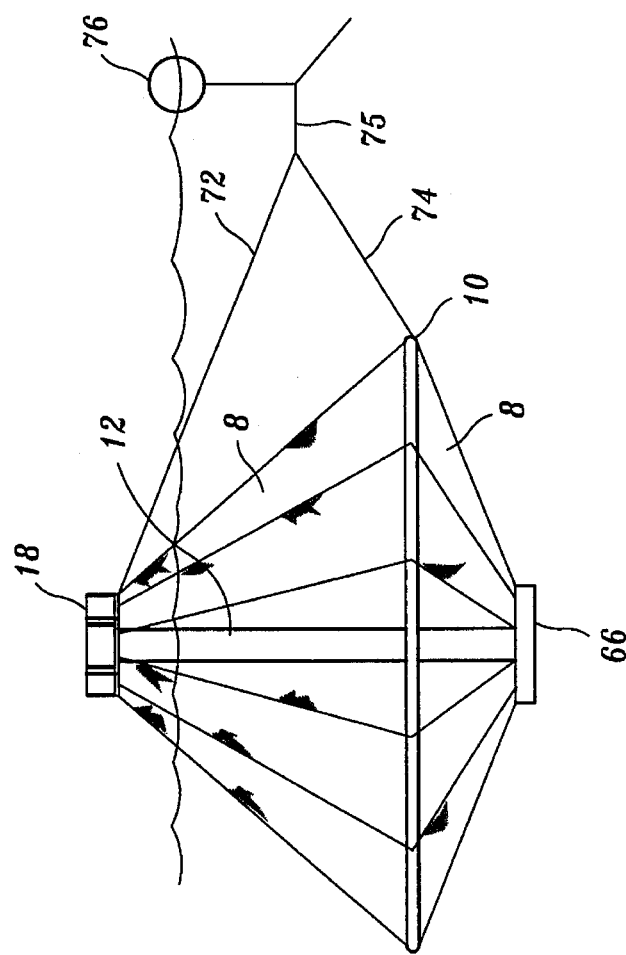
FIG. 9A is a schematic elevation of an embodiment of the fish pens of the invention adapted for bottom-feeding fish.

For certain applications, it may be preferable for the level of a horizontal ring to be significantly below the midpoint of the vertical spar buoy in order to maximize the portion of the net that is submerged and to minimize the effects of wave action on the pen. FIG. 9A schematically illustrates a fish pen, wherein the horizontal ring 10 is located in a plane that intersects the vertical spar buoy 12 approximately one-quarter of the distance from its distal end. As with the other embodiments described, the pen is preferably formed from a series of contiguous generally triangular netting segments 8, each having a wedged end attached in the vicinity of an upper end 14 of the spar buoy, and a broad end attached to the ring as shown in FIG. 9B. Similar triangular net segments comprise the lower section of the net and their wedge-shaped ends are attached to a fixed ballast 66, as shown, which is fixedly attached to the lower end of the lower section 16 of the spar buoy. In order to tow the pen, a first tow line 72 extends from the work station at the uppermost extremity of the spar buoy and is joined to a second tow line 74 extending from the ring, into a joint tow line 75. The joint tow line is preferably supplied with a buoy 76 so that it may be readily retrieved for tying onto a vessel for towing. Again, a combination damper plate and ballast weight may be suspended from the lower extremity of the buoy for stability.

Figure 10B:
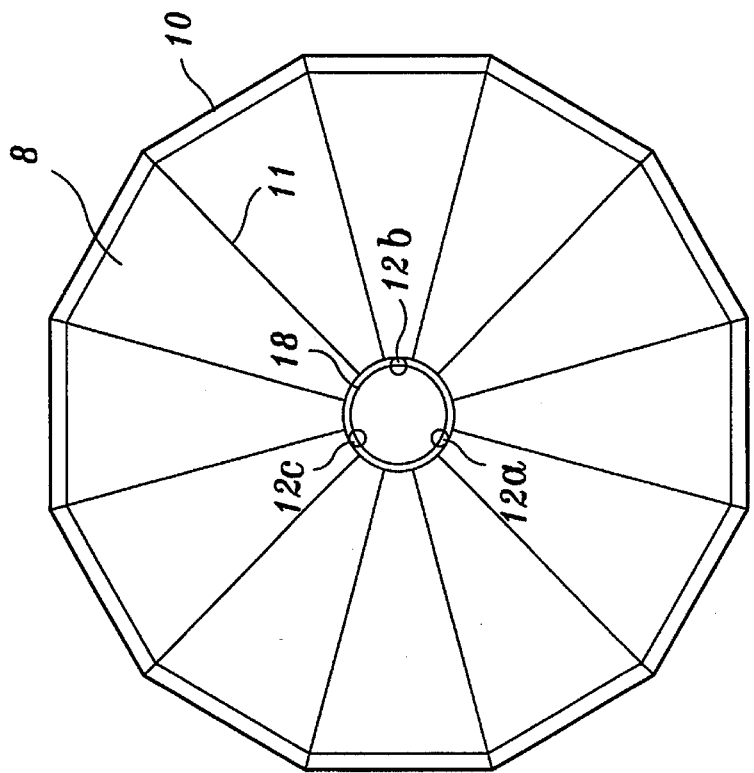
FIG. 10B is a top view of the embodiment of FIG. 10A.
Figure 10A:
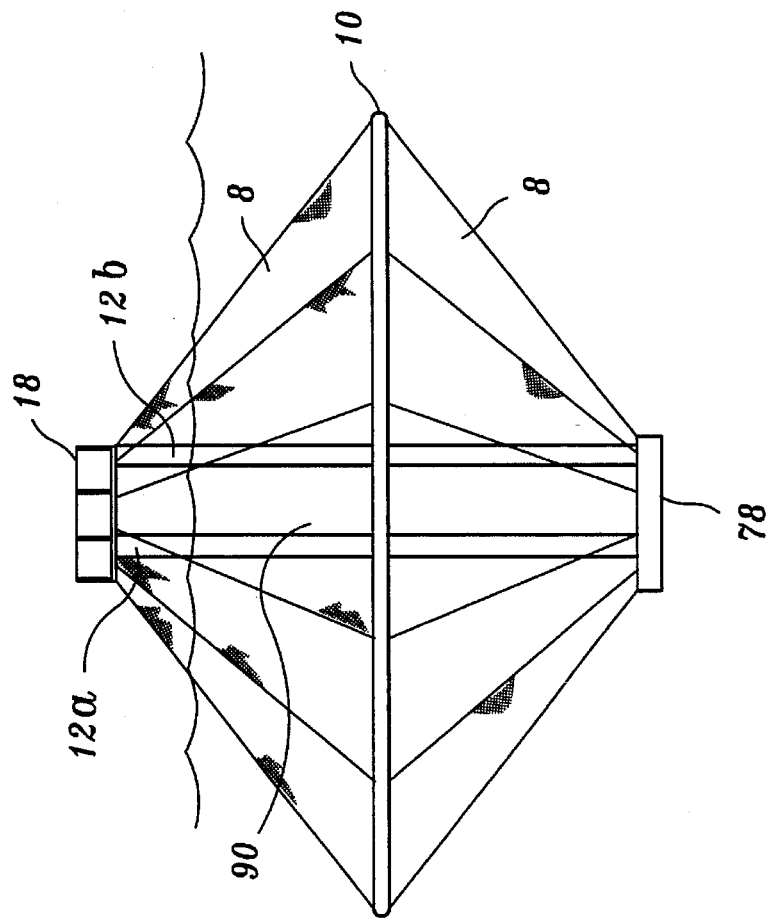
FIG. 10A is a schematic of an embodiment of a fish pen of the invention with a central grouping of spar buoys.

For certain applications, a single central large-diameter spar buoy may not be appropriate. In that event, the invention provides substitution with an array of several spar buoys connected by a rigid framework, as illustrated schematically in FIGS. 10A and 10B. In this particular embodiment, three spar buoys 12a, 12b, and 12c are grouped together and are surrounded by a common work platform 18 at their upper extremities, that forms a rigid framework for holding the buoys in an array. At the lower extremities, the spar buoys are also rigidly connected together by a ballast platform 78 so that the group of spar buoys together form a rigid structure. As with the other embodiments of pens of the invention, the group of spar buoys may be surrounded by a horizontal ring 10, or rings, of any geometrical configuration with the intervening spaces between vertically stacked horizontal rings, and between the ring(s) and the group of buoys, enclosed by flexible netting 8 to form a fish pen. The group of spar buoys may also be surrounded by a sheath of netting 90 to facilitate harvesting. Thus, fish are conditioned to obtain feed from within the sheathed area. At harvest time, fish are lured into this sheathed area, which is then sealed off to prevent escape of fish. This confinement of the fish to a smaller volume facilitates harvesting.

Figure 11B:
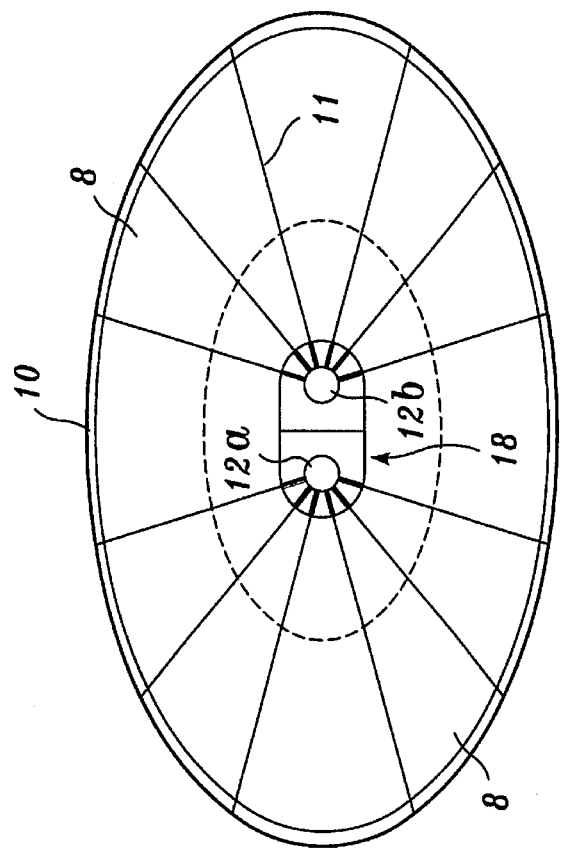
FIG. 11B is a top view of FIG. 11A.
Figure 11A:
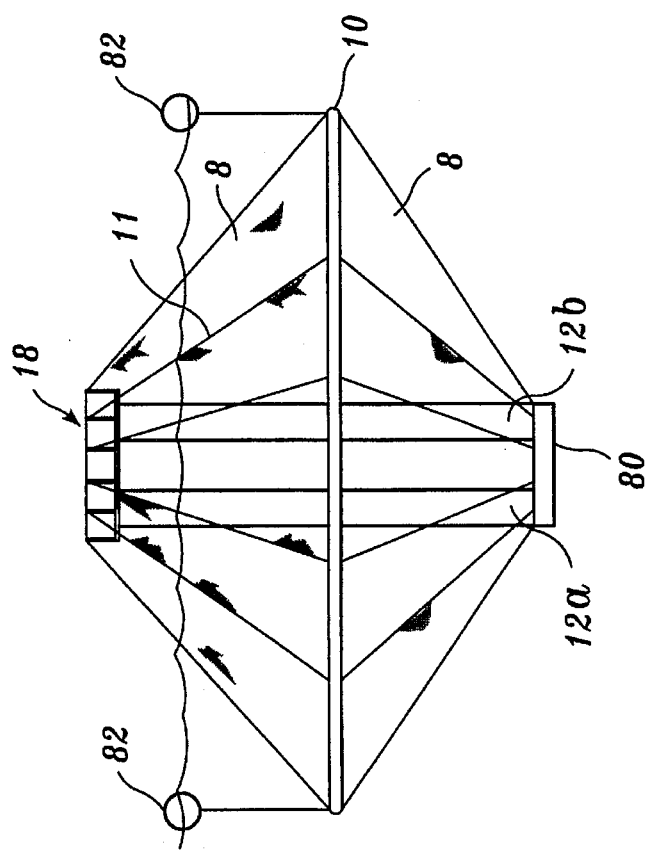
FIG. 11A is a schematic elevation view of an embodiment of the fish pens of the invention including two spar buoys surrounded by an elliptical ring.
Figure 13B:
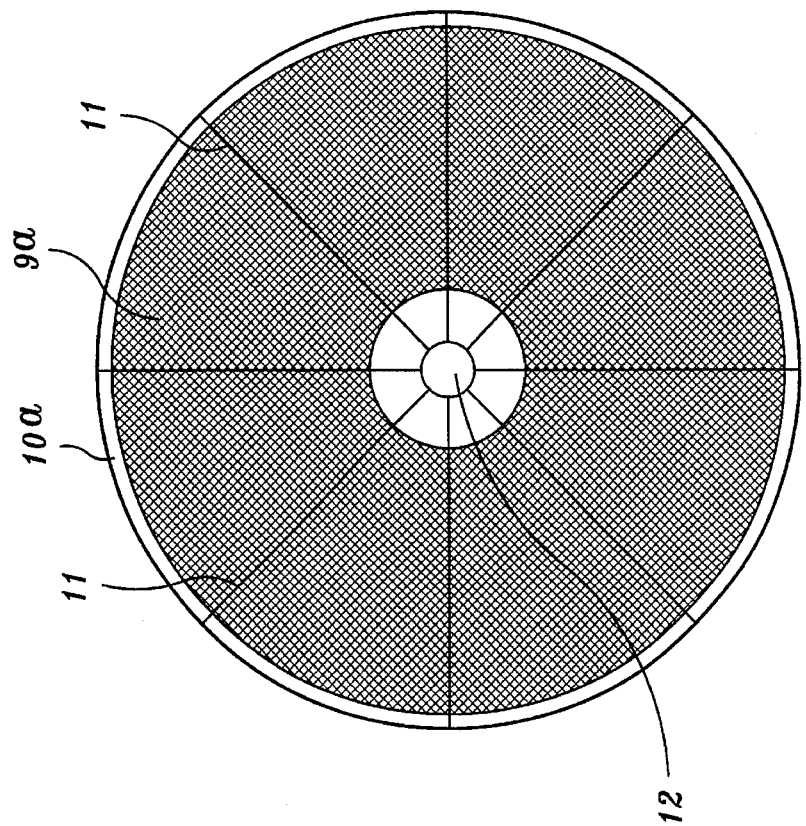
FIGS. 13A and B are a schematic elevation view of an embodiment of a shellfish pen according to the invention, and its plan view, respectively.
Figure 13A:
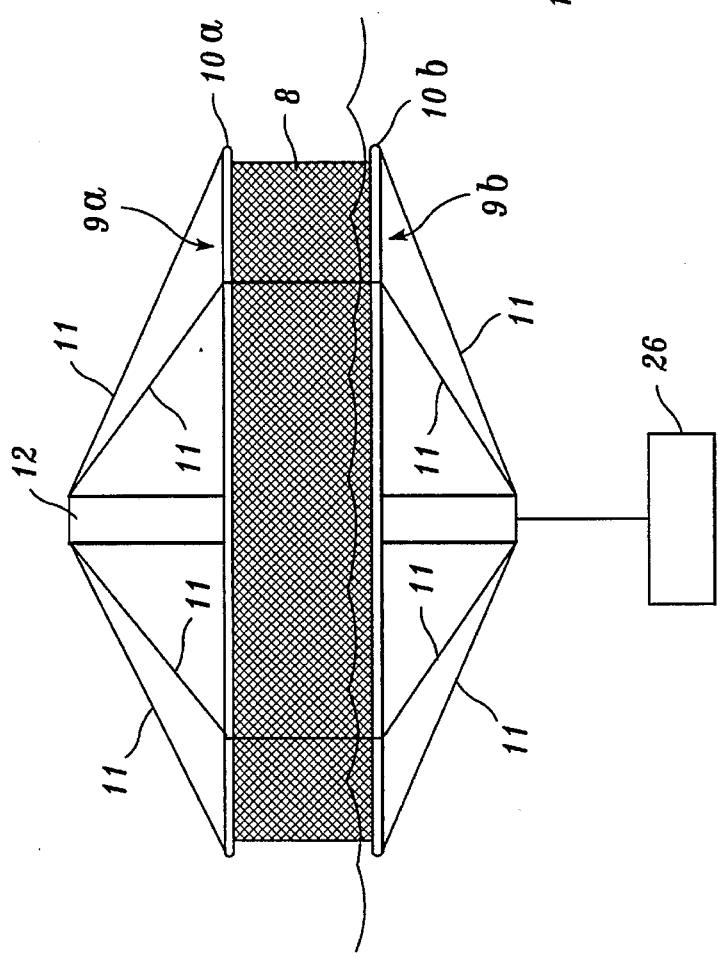

For certain applications, it may be desirable for the fish pen to have a shape that conforms to prevailing environmental conditions. For example, if the fish pen will be located in a geographic region where certain currents may be anticipated, then the fish pen may be designed for service in those currents. Thus, the horizontal ring or rings may be shaped to provide a narrower profile in the direction of the current, as illustrated in, for example, FIGS. 11A and 11B. In this embodiment, the fish pen of the invention has two side-by-side spar buoys 12a and 12b equidistant from a central point on a common platform 18 located near their upper extremities. The buoys are fixedly connected to each other at their lower extremities by a ballast and support bracket 80. A horizontal elliptical ring 10 surrounds the central spar buoys, with a series of contiguous netting segments 8 extending from the vicinity of the upper ends 14 of the spar buoys to the elliptical ring. Similar netting extends from the elliptical ring to the lower ballast support bracket 80 at the lower extremities of the spar buoys so that an enclosed pen is produced. As shown, the horizontal ring may be provided with additional ballast by attaching buoys 82 to the ring at spaced intervals. Also, the pen may be provided with a combination damper plate and ballast weight, if needed.

For certain operations in waters of particular depth, wherein strong currents are not encountered, a foreshortened spar buoy may be used. Thus, while the spar buoy provides support for the upper section of the net pen, the netting of the lower section of the pen is not directly attached or connected to the submerged lower end of the spar buoy. Instead, the spar buoy stops short of the lower end of the pen, as illustrated in the embodiment of FIGS. 12A and 12B. In this instance, the netting segments 8 of the lower section 32 of the pen extend from the horizontal ring 10 downward and inwardly for connection to a closure device, such as a combined damper and ballast plate 84. To enhance stability, a taut line 86 extends from the lower extremity of the foreshortened spar buoy 12 to the damper and ballast plate.

In a preferred embodiment, the lower portion 32 of the pens of the invention may be collapsed upward to reduce pen volume and facilitate fish harvesting. Likewise, in another embodiment, the upper portion 36 of the pen may be collapsed downward to drive fish to a lower portion of the pen. In general, for the lower netting portion 32 this is accomplished by a fish harvesting bracket arrangement whereby lower ends of the netting of the lower portion of the pen are attached to a mobile bracket capable of axially traversing the length of the spar buoy from a "rest position" near the lower extremity of the buoy to a "harvest position" near about the midsection of the buoy, or at a position near the surface of the water. Likewise, for the upper netting portion, the bracket arrangement has upper ends of the netting attached to the mobile bracket capable of axially traversing the buoy from a "rest position" near the upper extremity of the buoy, and to, a second position nearer the uppermost of the surrounding rings so that, when the mobile bracket is in the second position, the pen volume is reduced.

Figure 16:
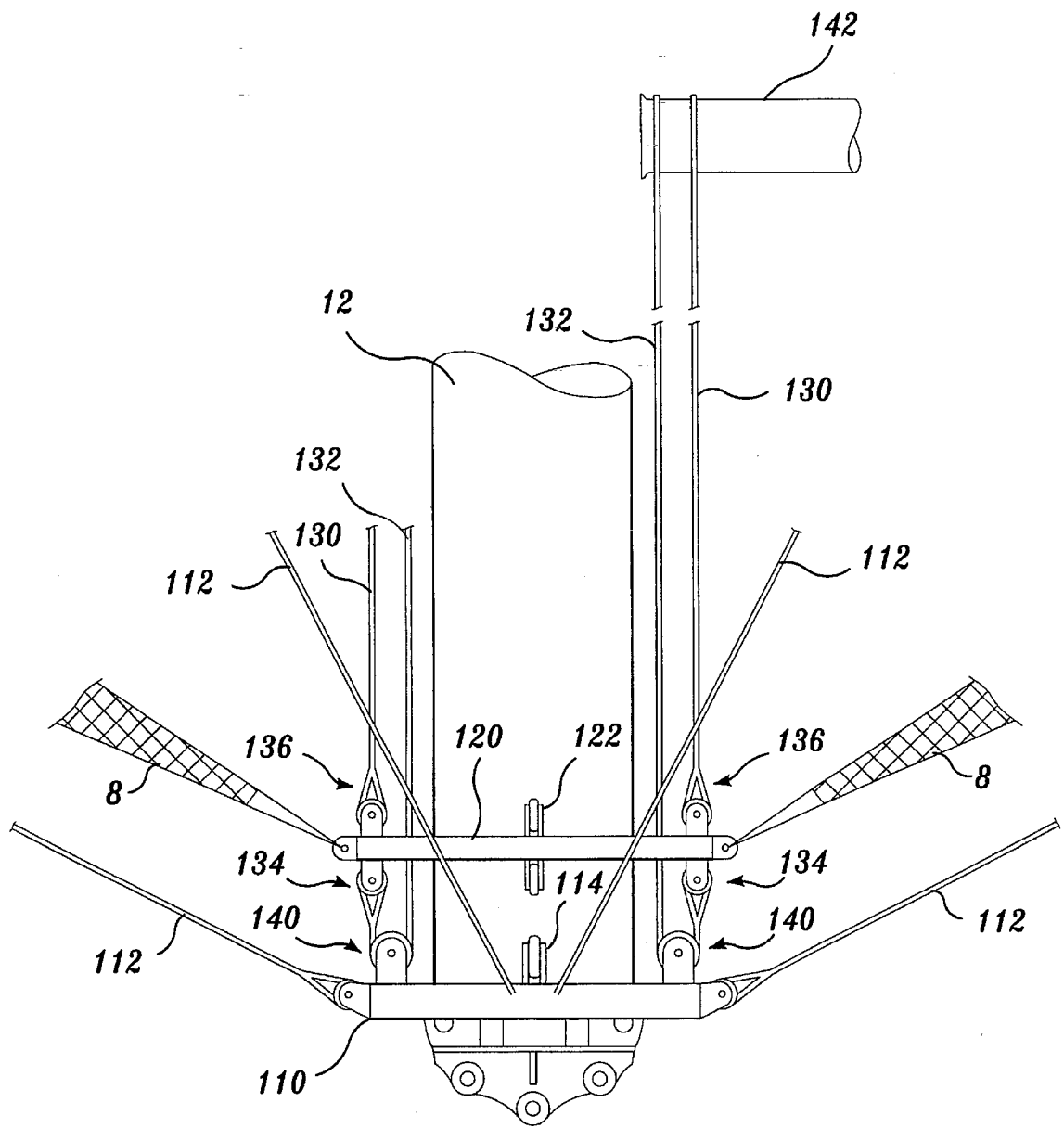
FIG. 16 is a schematic elevation view of an embodiment of a fish harvesting bracket for use with fish pens of the invention.

A more preferred version, shown in FIGS. 15 and 16, includes a first fixed bracket 110 fixedly attached to a lower extremity of the spar buoy 12. Clearly, a version with bracket at an upper extremity is symmetrically substantially similar except that a winch for hauling or net hauling lines is, of course, preferably above water. Indeed, if desired, mobile brackets may be used at either end of the buoy to collapse the netting from either or both ends, as needed. However, for illustrative purposes, only one embodiment is shown in FIGS. 15 and 16. The fixed bracket, preferably in the form of a ring, is optionally equipped with at least one, and preferably two or more, wheels 114 in rolling contact with the outer surface of the spar buoy to allow reciprocal movement of the fixed bracket axially along the spar buoy, when necessary. Rope stays 112 are attached to the support bracket 110 and extend to the horizontal ring 10, or the lowest horizontal ring, if more than one ring is used in conjunction with the spar buoy. These rope stays 112 are outside the netting 8 and support the netting of the lower section 32 of the pen 30. A mobile bracket 120 is mounted around the spar buoy, above the first fixed bracket. The mobile bracket is slidably mounted around the outer surface of the spar buoy to allow axial travel along the length of the spar buoy. In the embodiment shown, wheels 122 are mounted on the bracket 120 with surfaces in rolling contact with the buoy. Lower ends of the netting 8, which makes up the lower portion 32 of the pen, are fixedly attached to the mobile bracket.

During operation, the fixed bracket 110 is retained at a fixed location near the lowest extremity of the spar buoy, while the mobile bracket 120 traverses the buoy axially. During this axial movement, the lower portion 32 of the pen is lifted, toward the surface of the water, thereby decreasing pen volume and facilitating harvesting.

A preferred mechanism for raising and lowering the lower portion of the net includes a mechanical winch, net hauling lines, and turning blocks. The net hauling lines are maintained in taut condition and each has one end 136 fixedly attached to the mobile bracket. Referring to FIG. 16, a length of hauling line 130 extends from the fixed attachment location on the mobile bracket 120, around a turning block 140 mounted on the fixed bracket 110, and thence upward along the length of the spar buoy 12 and around a cylindrical mechanical winch 142, preferably located above the surface of the water and readily accessible by workers, for example on a work station 18 (shown in FIG. 15) at an upper extremity of the buoy. A further length of the net hauling line 132 extends from the winch 142 downward along the spar buoy and has an end 134 that is also fixedly attached to the mobile bracket 120. Thus, when the winch is rotated, the net hauling line lengths 130, 132 cooperate to move the mobile bracket 120 axially along the buoy 12 thereby increasing or decreasing the volume of the lower portion of the pen 32, depending upon the direction of movement of the mobile bracket.

In an alternative embodiment, especially adapted for the growing of shellfish, the pens of the invention have a midsection of independent, preferably rigid, structure that is connected to a central spar or spars by rope spokes. Thus, as shown in the embodiments of FIGS. 13A and 13B and 14A and 14B, a central spar buoy 12 is surrounded by preferably at least two stacked rings 10a and 10b with netting 8 extending between the rings. Horizontal enclosing netting 9a and 9b also extends from each ring, in the general plane of each respective ring, to an adjacent attachment point on the central spar buoy. Thus, when the rings are circular, then the enclosed pen structure is cylindrical, as can be seen more clearly by considering FIG. 13B in conjunction with FIG. 13A. On the other hand, when the surrounding rings are square, then the enclosed shellfish pen is in the shape of a rectangular box, as can be seen more clearly from considering FIG. 14B in conjunction with FIG. 14A. The shellfish cage is supported by rope spokes 11 extending from an upper extremity of the spar buoy to the uppermost surrounding ring 10a, and rope spokes 11 extending from the lower extremity of the spar buoy to the lowermost surrounding ring 10b. As before, the level of submergence of the shellfish pen may be adjusted by adjusting the ballast of the surrounding rings or spar buoy by filling with water to a required extent. Since shellfish pens are frequently nested together in a body of water for ease of feeding, care, and harvesting, it is preferred that the surrounding rings have straight sides as, for example, in square nets, to facilitate nesting of pens in close proximity to each other.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A pen for fish farming, the pen comprising:
   (a) at least one spar buoy adapted to be vertically oriented in a body of water, the buoy having an upper section and a lower section;
   (b) at least one horizontal ring surrounding the at least one spar buoy and spaced apart therefrom;
   (c) first flexible netting spanning the area between the at least one buoy and the at least one horizontal ring, the netting affixed in the vicinity of an upper end of the buoy and extending outwardly and downwardly toward said at least one horizontal ring and attached to said ring to form an upper enclosure; and
   (d) second flexible netting spanning the area between the at least one buoy and the at least one horizontal ring, the netting affixed to said at least one ring and extending downwardly and inwardly toward a lower end of the buoy and attached in the vicinity of said lower end of the buoy to form a lower enclosure.

2. The pen of claim 1, wherein the ring is circular and the first and second flexible netting comprise a contiguous series of pie-shaped net segments with wedge-shaped ends attached in the vicinity of the spar buoy and circumferential ends attached to the circular ring.

3. The pen of claim 1, wherein the ring is in the shape of a polygon.

4. The pen of claim 1, wherein the at least one horizontal ring comprises a first horizontal surrounding ring spaced from and directly above a second horizontal surrounding ring.

5. The pen of claim 4, comprising netting extending between the first and second rings to form a pen midportion.

6. The pen of claim 5, wherein the first and second rings are circular.

7. The pen of claim 1, wherein the at least one spar buoy comprises a plurality of spar buoys grouped together and surrounded by the at least one horizontal ring.

8. The pen of claim 7, wherein the at least one horizontal ring comprises a first horizontal surrounding ring spaced from and directly above a second horizontal surrounding ring.

9. The pen of claim 8, comprising netting extending between the first and second rings to form a pen midportion.

10. The pen of claim 9, wherein the first and second rings are circular.

11. The pen of claim 7, further comprising a work platform in the vicinity of proximal ends of the plurality of the spar buoys, said platform forming a substantially rigid structure holding the buoys in a group in stable positions relative to each other.

12. The pen of claim 11, comprising a ballast platform connecting lower extremities of the spar buoys.

13. The pen of claim 7, further comprising a sheath of netting surrounding the plurality of buoys to produce an enclosed space encompassing the buoys.

14. The pen of claim 1, further comprising a workstation located at an upper extremity of the at least one spar buoy.

15. The pen of claim 14, wherein the at least one spar buoy comprises a fish-feeding system comprising:
   (1) a feed-receiving portal near a proximal end of the upper section of the at least one buoy, said portal accessible from the workstation for filling fish feed via the portal;
   (2) a fish-feed storage bin in fluid communication with the receiving portal; and
   (3) at least one feed discharge portal, in fluid communication with the fish-feed bin, near the lower section of the at least one spar buoy from which fish feed may be discharged to feed fish in the pen.

16. The pen of claim 14, wherein the at least one spar buoy comprises a stairway extending along a longitudinal axis of the at least one buoy from the workstation to the lower section of the buoy.

17. The pen of claim 16, wherein the stairway is located in a vertical shaft in the at least one buoy, the shaft sized to allow passage of a diver and extending along a longitudinal axis of the at least one buoy to a diving portal in the lower section of the buoy.

18. The pen of claim 1, wherein the at least one horizontal ring comprises a plurality of vertically spaced rings, at least two of said plurality of rings having horizontal floors extending in the plane of the rings, some of the floors having passages therethrough to allow fish to pass from one floor to the next.

19. The pen of claim 1, wherein the at least one ring is asymmetrical in shape so that a narrower profile is presented to a water current flow when the pen is in use in a body of water.

20. The pen of claim 1, wherein the second flexible netting attached in the vicinity of the lower end of the buoy to form an enclosure comprises netting ends, said ends attached to a mobile bracket, said bracket capable of axially traversing the buoy from a first rest position near a lower extremity of the at least one buoy to another position nearer the water interface, when the pen is in use.

21. The pen of claim 1, wherein the first flexible netting attached in the vicinity of the upper end of the buoy to form an enclosure comprises netting ends, said ends attached to a mobile bracket, said bracket capable of axially traversing the buoy from a first rest position near an upper extremity of the at least one buoy to another position nearer the water interface, when the pen is in use.

22. The pen of claim 1, further comprising:
   (a) a first bracket fixedly attached to an upper extremity of the at least one spar buoy;
   (b) a plurality of rope stays, each with one end attached to the fixed bracket and another end attached to a lowest of the at least one horizontal ring;

(c) a second mobile bracket mounted around the spar buoy and nearer to a midsection of the at least one spar buoy than the first bracket, with the lower ends of the netting of the lower portion of the pen fixedly attached to the mobile bracket; and net hauling lines, each comprising one end attached to the first bracket; and another end fixedly attached to the mobile bracket;

whereby cooperative hauling of the net hauling lines causes the mobile bracket to travel axially along the buoy thereby increasing pen volume when said bracket moves toward the extremity of the buoy, and decreasing the pen volume when said bracket moves in an opposite direction.

23. The pen of claim 1, wherein the at least one ring is an inflatable ring.

24. The pen of claim 23, wherein the second flexible netting attached in the vicinity of the lower end of the buoy to form a lower enclosure comprises netting ends, said ends attached to a mobile bracket mounted slidably around at least a portion of an outer surface of the buoy, said bracket capable of axially traversing the buoy from a first position near a lower extremity of the buoy to a second position near a portion of the buoy at the water interface, when the pen is in use.

25. The pen of claim 23, wherein the first flexible netting attached in the vicinity of the upper end of the buoy to form an upper enclosure comprises netting ends, said ends attached to a mobile bracket mounted slidably around at least a portion of an outer surface of the buoy, said bracket capable of axially traversing the buoy from a first position near an upper extremity of the buoy to a second position nearer a portion of the buoy at the water interface, when the pen is in use.

26. The pen of claim 1, wherein the at least one ring comprises a series of spaced rings, a central ring of the series having a largest diameter and rings spaced away from the central ring having progressively smaller diameters relative to the central ring.

27. A shellfish pen comprising:
(a) at least one spar buoy adapted to be vertically oriented in a body of water, the buoy having an upper section for projecting above the water surface, and a lower section for submerging beneath the water surface;
(b) at least two vertically spaced horizontal rings surrounding the at least one spar buoy and spaced therefrom;
(c) vertical netting enclosing areas between the two horizontal rings;
(d) upper substantially horizontal netting enclosing areas between an upper of the at least two rings and the at least one spar buoy and lower substantially horizontal netting enclosing areas between a lower of the at least two rings and the at least one spar buoy; and
(e) first supporting taut lines extending from near an upper end of the at least one spar buoy to first points of attachment on an upper horizontal ring, and second supporting taut lines extending from near an end of the lower section of the spar buoy to second points of attachment on a lower horizontal ring.

28. The shellfish pen of claim 27, wherein the vertical netting is rigid.

29. The shellfish pen of claim 27, wherein the lower horizontal netting is rigid.

30. The shellfish pen of claim 27, wherein the at least two vertically spaced rings are rectangular rings of substantially equal size.

31. The shellfish pen of claim 27, wherein the at least one spar buoy is one buoy, and the at least two vertically spaced rings are two rings.

32. The shellfish pen of claim 31, wherein the vertical, upper horizontal, and lower horizontal netting are rigid.

33. A pen for fish farming, the pen comprising:
(a) a spar buoy adapted to orient vertically in a body of water, the buoy having an upper section and a lower section;
(b) a horizontal ring surrounding the spar buoy and spaced therefrom;
(c) first flexible netting spanning the area between the buoy and the horizontal ring, the netting affixed in the vicinity of an upper end of the buoy and extending outwardly and downwardly toward said horizontal ring, and attached to said ring, to form an upper enclosure; and
(d) second flexible netting spanning the area between the buoy and the horizontal ring, the netting affixed to said ring and extending downwardly and inwardly toward a lower end of the buoy, and attached in the vicinity of said lower end of the buoy, to form a lower enclosure.

34. The pen of claim 33, further comprising:
(a) a first bracket fixedly attached to an upper extremity of the spar buoy;
(b) a plurality of rope stays, each with one end attached to the fixed bracket and another end attached to the horizontal ring; and
(c) a mobile bracket slidably mounted around at lest a portion of the spar buoy, and nearer a midsection of the buoy than the first bracket with ends of the netting of the pen fixedly attached to the mobile bracket; and
  (i) net hauling lines interconnecting the first bracket and the mobile bracket to allow movement of the mobile bracket relative to the fixed bracket;
whereby hauling of the net hauling lines causes the mobile bracket to travel axially along the buoy, thereby adjusting pen volume.

35. The pen of claim 33, wherein the horizontal ring is circular.

36. The pen of claim 33, wherein the spar buoy comprises a workstation mounted on an upper end thereof, and the first flexible netting comprises upper netting ends, said ends tied to the workstation.

37. The pen of claim 33, wherein the ring is inflatable.

38. A pen for fish farming, the pen comprising:
(a) at least one spar buoy adapted to be vertically oriented in a body of water, the buoy having an upper section and a lower section;
(b) at least one horizontal ring surrounding the at least one spar buoy and spaced apart therefrom;
(c) first flexible netting spanning the area between the at least one buoy and the at least one horizontal ring, the netting affixed in the vicinity of an upper end of the buoy and extending outwardly and downwardly toward said at least one horizontal ring and attached to said ring to form an upper enclosure; and
(d) second flexible netting spanning the area between the at least one horizontal ring, the second flexible netting affixed to said at least one ring and extending downward and inward to attach to a combined damper and ballast plate, the plate located beneath a lower extremity of the at least one spar buoy and connected to the lower extremity by a taut line.

* * * * *